(12) United States Patent
Takano

(10) Patent No.: US 6,751,968 B2
(45) Date of Patent: Jun. 22, 2004

(54) VEHICLE AIR CONDITIONER HAVING REFRIGERANT CYCLE WITH HEATING FUNCTION

(75) Inventor: Yoshiaki Takano, Kosai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/457,725

(22) Filed: Jun. 9, 2003

(65) Prior Publication Data

US 2003/0230094 A1 Dec. 18, 2003

(30) Foreign Application Priority Data

Jun. 12, 2002 (JP) ........................................ 2002-171565

(51) Int. Cl.[7] ................................................ F25B 1/00
(52) U.S. Cl. .......................... 62/159; 62/228.5; 62/128; 62/150
(58) Field of Search ........................... 62/159, 160, 180, 62/277, 228.5, 229, 140, 139, 324.1, 324.5, 128, 150, 272, 196.4

(56) References Cited

U.S. PATENT DOCUMENTS

| 6,058,728 | A | * | 5/2000 | Takano et al. | ................. 62/159 |
| 6,220,042 | B1 | * | 4/2001 | Robillard et al. | .......... 62/196.4 |
| 6,250,093 | B1 | * | 6/2001 | Fujii et al. | ................. 62/228.5 |
| 6,263,687 | B1 | * | 7/2001 | Ban et al. | ..................... 62/159 |
| 6,311,505 | B1 | | 11/2001 | Takano et al. | |

FOREIGN PATENT DOCUMENTS

JP  5-272817  10/1993

* cited by examiner

*Primary Examiner*—Harry B. Tanner
(74) *Attorney, Agent, or Firm*—Harness, Dickey & Pierce, PLC

(57) ABSTRACT

In a vehicle air conditioner, a refrigerant cycle system is constructed to switch a cooling refrigerant cycle where an interior heat exchanger is used as an evaporator, and a hot gas heater cycle where the interior heat exchanger is used as a radiator. Further, determining means of a control unit determines whether the interior heat exchanger has a quantity of retained water in a heating mode with the hot gas heater cycle. When the determining means determines that the interior heat exchanger has the quantity of retained water in the heating mode while a blower stops, operation of the heating mode is stopped. On the other hand, when the determining means determines the interior heat exchanger does not have the quantity of retained water in the heating mode while the blower stops, the operation of the heating mode is performed.

7 Claims, 5 Drawing Sheets

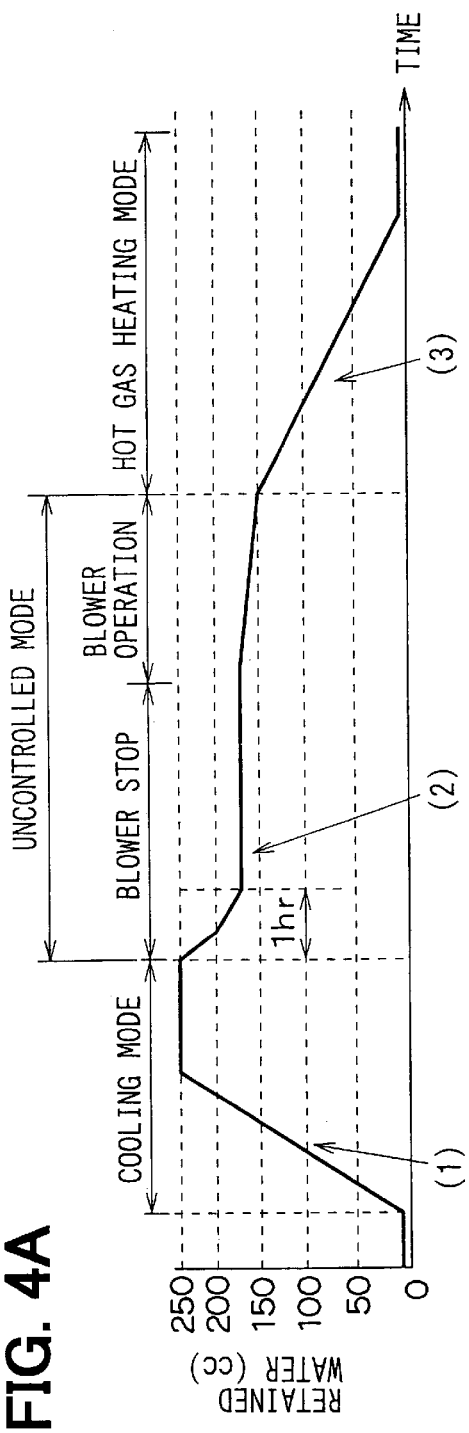
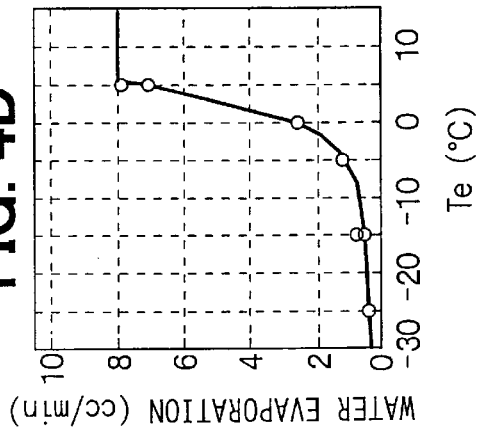
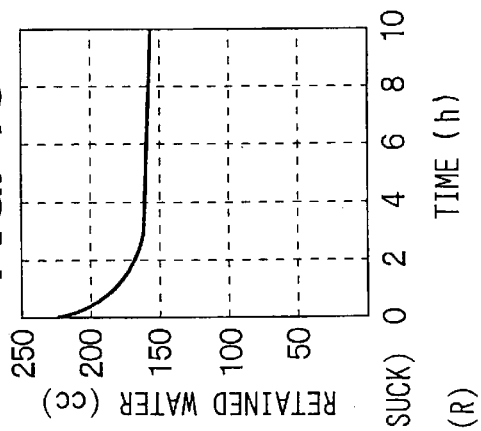
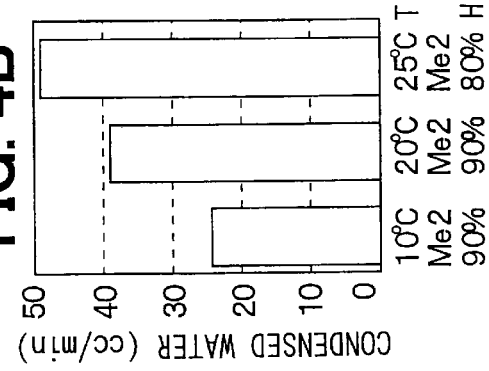

VEHICLE AIR CONDITIONER HAVING REFRIGERANT CYCLE WITH HEATING FUNCTION

CROSS REFERENCE TO RELATED APPLICATION

This application is based on Japanese Patent Application No. 2002-171565 filed on Jun. 12, 2002, the disclosure of which is incorporated herein by reference.

FIELD OF THE INVENTION

The present invention relates to a vehicle air conditioner having a hot gas heating function using an interior heat exchanger (evaporator) as a radiator by directly introducing a gas refrigerant (hot gas) discharged from a compressor into the interior heat exchanger. The present invention relates particularly to a system in which condensed water is prevented from evaporating in the interior heat exchanger and from fogging a vehicle windshield in a heating mode.

BACKGROUND OF THE INVENTION

In a conventional vehicle air conditioner, hot water (i.e., engine cooling water) is circulated in a heating heat exchanger during a heating operation in winter to heat air in the heating heat exchanger by using the hot water as a heat source. In this case, when the hot water temperature is low, the temperature of air to be blown into a passenger compartment is lowered and thus may be insufficient for a heating capacity.

Thus, JP-A No. H5-272817 proposes a vehicle air conditioner which has a heating function by using a hot gas heater cycle. When the hot water temperature is lower than a predetermined value as just after the start-up of an engine, gas refrigerant (or hot gas) discharged from a compressor is introduced into an interior heat exchanger (evaporator) while bypassing a condenser to release the heat from the gas refrigerant to the air in the interior heat exchanger to obtain an auxiliary heating function. That is, in the above conventional vehicle air conditioner, one interior heat exchanger disposed in an air conditioner case is selectively used as a cooler in a cooling mode and as a radiator in a heating mode.

By the way, in the vehicle air conditioner, an inside air mode may be set to prevent contaminated outside air from being introduced during the heating mode in winter. In this case, it is necessary for the evaporator to cool and dehumidify the air to prevent the windshield from fogging. Accordingly, until an outside air temperature drops to 0° C., the refrigerating cycle may be used in the cooling mode.

After the refrigerating cycle is operated at an outside air temperature of about 0° C. with the cooling mode to prevent the fogging of the windshield, the refrigerating cycle may be switched to the hot gas heater cycle (heating mode) to increase the heating capacity. Moreover, after the refrigerating cycle is operated with the cooling mode and then is stopped at once and is started with the hot gas heating cycle (heating mode).

In the above case, condensed water generated in the cooling mode of the refrigerating cycle remains on the surface of the interior heat exchanger. Thus, if the refrigerating cycle is started in the heating mode, the interior heat exchanger functions as the radiator of the gas refrigerant to rapidly increase the temperature of the interior heat exchanger. Accordingly, the condensed water on the surface of the interior heat exchanger evaporates, and air having a high humidify is blown into the passenger compartment, so that the vehicle windshield is fogged.

Moreover, the condensed water once generated on the interior heat exchanger by the operation of the cooling mode does not easily evaporate at a low outside air temperature in winter and may remain for a long time. Thus, even not just after switching from the cooling mode to the heating mode, the vehicle windshield may be fogged by starting the heating mode of the refrigerating cycle.

Thus, the present applicant proposed, in JP-A No. 2000-219034 (corresponding to U.S. Pat. No. 6,311,505), an invention of aiming to prevent the condensed water in the interior heat exchanger from evaporating and fogging the vehicle windshield in the heating mode in the vehicle air conditioner having the hot gas heating function.

In this related art, a physical quantity relating to the temperature of the windshield and the inside air humidity in the vicinity of the vehicle windshield are detected and it is determined based on this physical quantity whether or not the windshield is in the state of fogging. When it is determined that the vehicle windshield is in the state of fogging, the refrigerating cycle is controlled so as to suppress the temperature of the interior heat exchanger. More specifically, the temperature of the air blown out of the interior heat exchanger is controlled to suppress the evaporation of the condensed water in the interior heat exchanger to thereby prevent the vehicle windshield from fogging.

However, in an automatic control system of this air conditioner, when the temperature of the engine-cooling water is low in the winter, warm-up control is performed for preventing cool air from being blown into the passenger compartment. In the warm-up control, even when a blower switch is turned on, a stop state of a blower is maintained until the temperature of the water in the engine is increased to a predetermined temperature (e.g., 30°). Therefore, when the hot gas heating mode is set and the hot gas heater cycle is operated while the stop state of the blower is maintained in the warm-up control, the temperature of the interior heat exchanger is rapidly increased due to high-temperature refrigerant discharged from the compressor because air is not blown to the interior heat exchanger. As a result, in this air conditioner, it is necessary to stop the operation of the hot gas heating mode while the blower stops. Therefore, in this case, it is difficult to obtain a temperature increasing effect of water in the engine, due to the operation of the hot gas heating mode.

SUMMARY OF THE INVENTION

In view of the above-described problems, it is an object of the present invention to provide a vehicle air conditioner that can perform a hot gas heating mode while preventing a vehicle windshield from fogging, even when a blower for blowing air stops.

According to the present invention, an air conditioner includes a blower disposed in an air conditioning case for blowing air, a refrigerant cycle with a hot gas heating function, and a control unit for controlling operation of the refrigerant cycle. The refrigerant cycle system includes a compressor for compressing refrigerant, an exterior heat exchanger disposed outside the air conditioning case, a pressure reducing device for decompressing refrigerant, an interior heat exchanger disposed inside the air conditioning case and a hot gas bypass passage through which refrigerant discharged from the compressor is directly introduced into the interior heat exchanger while bypassing the exterior heat exchanger. The refrigerant cycle system is constructed to switch a cooling refrigerant cycle where refrigerant discharged from the compressor is returned to the compressor through the exterior heat exchanger, the pressure reducing device and the interior heat exchanger, and a hot gas heater cycle where the refrigerant discharged from the compressor is directly introduced to the interior heat exchanger through the hot gas bypass passage. Further, the control unit controls operation of the refrigerant cycle system to set a cooling mode for cooling air in the interior heat exchanger by using the cooling refrigerant cycle, and a hot gas heating mode for heating air in the interior heat exchanger by using the hot gas heater cycle. In the air conditioner, control means of the control unit performs operation of the heating mode when determining means of the control unit determines that the interior heat exchanger does not have the quantity of retained water when the heating mode is set while operation of the blower stops, and stops the operation of the heating mode when the determining means determines that the interior heat exchanger has the quantity of retained water when the heating mode is set while operation of the blower stops.

When the operation of the blower stops, because air is not blown into the interior heat exchanger, the temperature of air from the interior heat exchanger is greatly increased as compared with a case where the blower operates. However, when the interior heat exchanger does not have the quantity of retained water, the windshield is not fogged even when the heating mode is performed. Accordingly, in the present invention, when the determining means determines that the interior heat exchanger does not have the quantity of retained water while the operation of the blower stops, the operation of the heating mode is continued while a heating capacity control based on temperature of air from the interior heat exchanger is not performed. Thus, even when the blower is stopped in the heating mode, compressor-driving load of the engine increases, the water temperature in the vehicle engine increases, and heating capacity of a hot-water type heat exchanger can be rapidly increased. On the other hand, because the operation of the heating mode is stopped when the interior heat exchanger has the quantity of retained water, it can prevent the windshield from being fogged.

Further, when the determining means determines that the interior heat exchanger does not have the quantity of retained water when the heating mode is set while the blower operates, the control means performs operation of the heating mode. Accordingly, when it is unnecessary to perform the defogging control, the heating capacity in the heating mode can be effectively improved without restricting the temperature of air blown from the interior heat exchanger. On the other hand, when the determining means determines that the interior heat exchanger has the quantity of retained water when the heating mode is set while the blower operates, the control means controls temperature of air blown out of the interior heat exchanger to a range lower than a dew point even when air blown out of the air conditioning case is cooled by a vehicle windshield. Therefore, it can prevent the windshield from being fogged in the operation of the blower. For example, the quantity of retained water is calculated based on at least a quantity of condensed water in the interior heat exchanger in the cooling mode, a quantity of evaporation of condensed water in the interior heat exchanger in the heating mode, and a quantity of condensed water discharged from a discharge port of the air conditioning case in an uncontrolled mode where the compressor is in a stop state. Alternatively, the quantity of condensed water is calculated at least based on an elapsed time after a stop of operation of the cooling mode.

BRIEF DESCRIPTION OF THE DRAWINGS

Other objects, features and advantages of the present invention will become more apparent from the following detailed description made with reference to the accompanying drawings, in which:

FIG. 4A is a graph for calculating the quantity of retained water in the evaporator in accordance with the first embodiment, FIG. 4B is a graph showing the quantity of condensed water for unit time in a cooling mode shown in FIG. 4A, FIG. 4C is a graph showing the quantity of retained water in the evaporator in an uncontrolled mode shown in FIG. 4A, and FIG. 4D a graph showing the quantity of evaporated water for unit time in a hot gas heating mode shown in FIG. 4A;

DETAILED DESCRIPTION OF THE PREFERRED EMBODIMENTS

Preferred embodiments of the present invention will be described hereinafter with reference to the accompanying drawings.

(First Embodiment)

Figure 1:
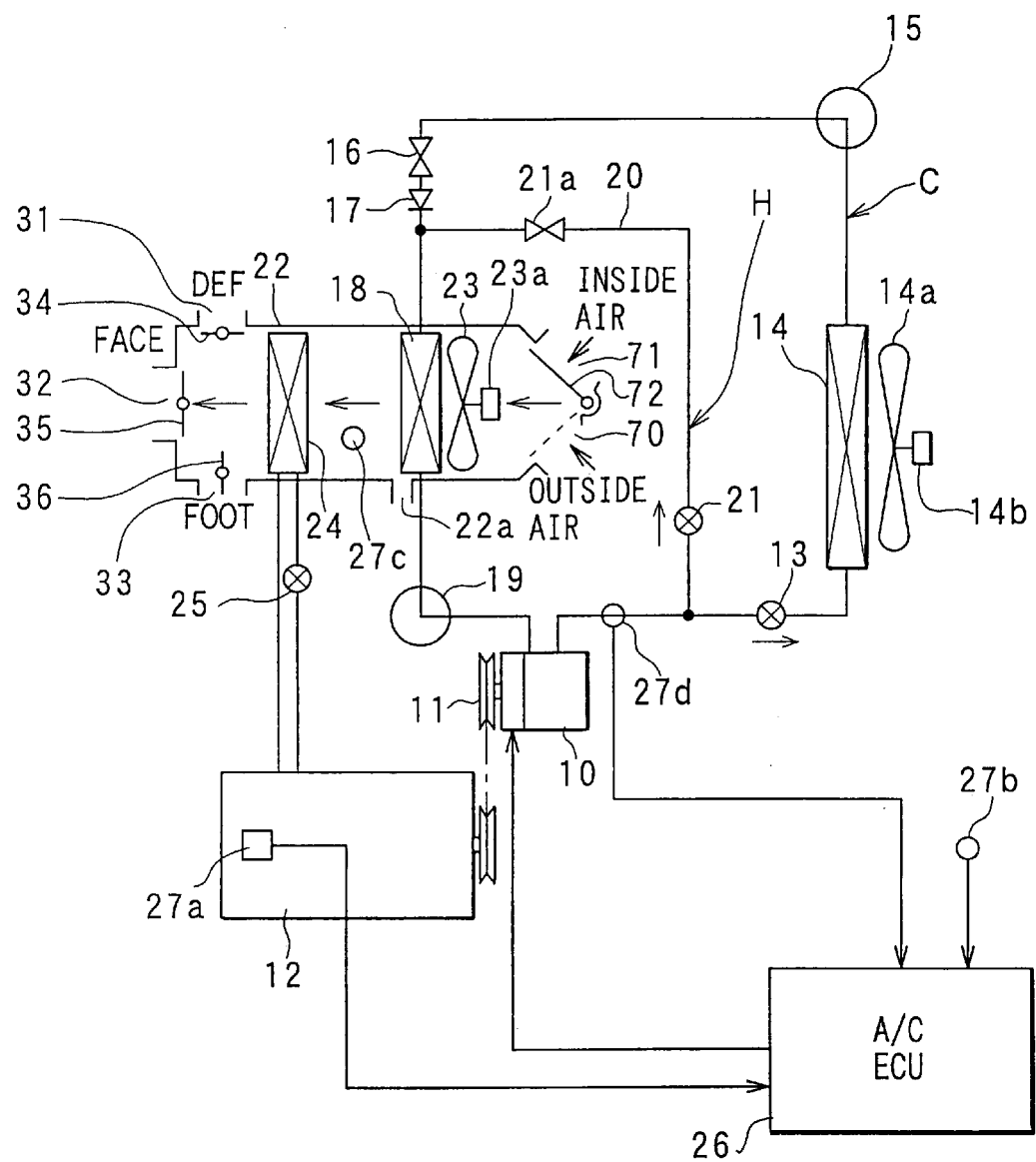
FIG. 1 is a schematic diagram showing a general structure of a vehicle air conditioner according to a first embodiment of the present invention.

FIG. 1 shows the general structure of a vehicle air conditioner in accordance with the first embodiment of the present invention. A compressor 10 is driven through an electromagnetic clutch 11 by a water-cooled vehicle engine 12, and is constructed, for example, by a fixed displacement type swash plate compressor.

The discharge side of the compressor 10 is connected through a solenoid valve 13 for cooling to a condenser 14. The outlet side of the condenser 14 is connected to a liquid receiver 15 for separating the refrigerant into gas refrigerant and liquid refrigerant, and the liquid refrigerant is stored in the receiver 15. The condenser 14 is an exterior heat exchanger which is arranged together with the compressor 10 or the like in a vehicle engine room. The condenser 14 exchanges heat with the outside air (or cooling air) blown by an electric cooling fan 14a. The electric cooling fan 14a is driven by an electrical motor 14b.

Moreover, the outlet side of the liquid receiver 15 is connected to a thermal expansion valve 16 that is a pressure reducing device for cooling. The outlet side of this thermal expansion valve 16 is connected through a check valve 17 to an evaporator 18. The outlet side of the evaporator 18 is connected through an accumulator 19 to the suction side of the compressor 10.

An ordinary cooling refrigerating cycle C is constructed of a closed circuit from the discharge side of the above-mentioned compressor 10 to the suction side of the compressor 10 through the solenoid valve 13 for cooling, the condenser 14, the liquid receiver 15, the thermal expansion valve 16, the check valve 17, the evaporator 18 and the accumulator 19, in this order.

The thermal expansion valve 16, as is well known in the art, regulates its valve opening (or refrigerant flow rate) so that the degree of superheat of the outlet refrigerant of the evaporator 18 can be kept at a predetermined value in an ordinary refrigerating cycle operation (or in a cooling mode). The accumulator 19 separates the refrigerant into the gas refrigerant and the liquid refrigerant, so that the gas refrigerant and a small quantity of liquid refrigerant (in which the oil dissolves) in the vicinity of the bottom are sucked into the compressor 10.

On the other hand, between the discharge side of the compressor 10 and the inlet side of the evaporator 18, a hot gas bypass passage 20 through which refrigerant is directly introduced into the evaporator 18 while bypassing the condenser 14 and the like is provided. A solenoid valve 21 for heating and a throttle 21a are disposed in series in the hot gas bypass passage 20. The throttle 21a is a pressure reducing unit for the heating operation. The throttle 21a can be constructed by a fixed throttle such as an orifice or a capillary tube. A hot gas heater cycle H for the heating operation is constructed of a closed circuit from the discharge side of the compressor 10 to the suction side of the compressor 10 through the solenoid valve 21 for heating, the throttle 21a, the evaporator 18 and the accumulator 19, in this order.

An air conditioner case 22 of the vehicle air conditioner defines an air passage through which air flows into a passenger compartment. The air is blown in the air conditioner case 22 by an electric air conditioning blower 23. The air conditioning blower 23 is shown by an axial-flow type to simply show it, but, in reality, is a centrifugal blower having a centrifugal fan. The air conditioning blower 23 is rotated by a blower motor 23a controlled by a blower drive circuit. Here, it is possible to change the quantity of air blown by the blower 23 in the embodiment continuously or stepwise by adjusting a blower control voltage applied to the blower motor 23a.

Further, on the suction side of the air conditioning blower 23a, an outside air suction port 70 for sucking air outside the passenger compartment (hereinafter referred to as "outside air"), and an inside air suction port 71 for sucking air inside the passenger compartment (hereinafter referred to as "inside air") are provided. The inside air suction port 71 and the outside air suction port 70 are opened and closed by an inside air/outside air switching door (inside air/outside air switching means) 72. Here, the inside air/outside air switching means 72 is driven via a link mechanism (not shown) by an actuator such as a servo-motor to switch at least an outside air suction mode for sucking the outside air from the outside air suction port 70 and an inside air suction mode for sucking the inside air from the inside air suction port 71.

The evaporator 18 is an interior heat exchanger which is disposed in the air conditioner case 22. The refrigerant is circulated in the cooling mode by the refrigerating cycle C for the cooling operation to cool the air blown by the air conditioning blower 23 through the refrigerant evaporation (heat absorption) in the evaporator 18. On the other hand, in the heating mode, a hot gas refrigerant (hot gas) flows into the evaporator 18 through the hot gas bypass passage 20 to heat the air, so that the evaporator 18 functions as a radiator.

Here, in the air conditioning case 22, a discharge port 22a for discharging the condensed water generated in the evaporator 18 is provided at the lower portion of the evaporator 18, so that the condensed water is discharged to the outside of the passenger compartment through a discharge pipe (not shown) connected to the discharge port 22a.

In the air conditioning case 22, at the downstream side of the evaporator 18 in the air flow direction, a hot-water type heating heat exchanger 24 for heating the air from the evaporator 18 by using the hot water (engine cooling water) from the vehicle engine 12 as a heat source is disposed. A hot water circuit from the vehicle engine 12 to the heating heat exchanger 24 is provided with a hot water valve 25 for controlling the flow of the hot water.

By the way, the hot water type heating heat exchanger 24 constitutes a main heating unit for heating the passenger compartment. Relative to the main heating unit, the evaporator 18 (interior heat exchanger) functioning as a heat radiator by the hot gas heater cycle H constitutes an auxiliary heating unit.

On the other hand, on the most downstream side of the air conditioning case 22 in the air flow direction, plural air outlet ports 31–33 are provided. The plural air outlet ports 31–33 includes a defroster (DEF) blowing port 31 for blowing out conditioned air toward the inside surface of the vehicle front windshield, a face (FACE) blowing port 32 for blowing out conditioned air (mainly, cooled air) toward the face portion (upper half of the body) of an occupant in the passenger compartment, and a foot (FOOT) blowing port 33 for blowing out conditioned air (mainly, warm air) toward the foot portion (lower half of the body) of the occupant. Moreover, a plurality of mode switching doors 34–36 for selectively opening/closing these blowing ports 31–33 are provided. Here, these mode switching doors 34–36 construct an air-outlet mode switching unit, and are driven by an actuator such as a servo-motor via a link mechanism (not shown).

An air conditioning electronic control unit (herein after referred to as "ECU") 26 is constructed of a microcomputer and its peripheral circuits, and performs a predetermined computation in accordance with preset programs to open and close the solenoid valves 13, 21 and to control the actions of the remaining electronic devices (11, 14a, 23, 25 and the like).

Figure 2:
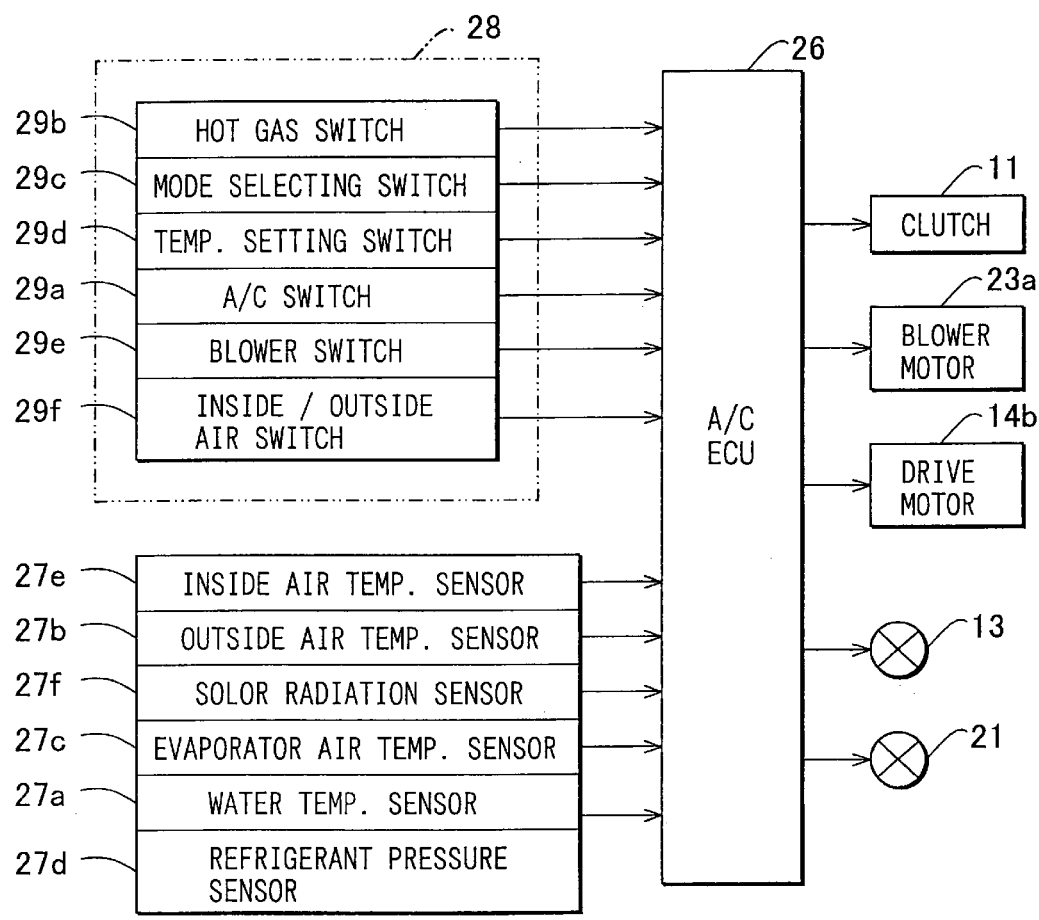
FIG. 2 is a block diagram of an electric control of the first embodiment.

FIG. 2 is an electric control block diagram of the first embodiment. Detection signals are applied to the ECU 26 from a set of sensors including a water temperature sensor 27a of the vehicle engine 12, an outside air temperature sensor 27b, an air temperature sensor 27c of the evaporator 18, and a pressure sensor 27d of a compressor discharge pressure, an inside air temperature sensor 27e, and a solar radiation sensor 27f for detecting the amount of solar radiation entering into the passenger compartment.

Also, control signals of a group of control switches 29a–29f are applied to the ECU 26 from an air conditioning operation panel 28 that is disposed in the vicinity of a dashboard in the passenger compartment. That is, an air conditioning switch 29a commands the start and stop of the compressor 10 in the refrigerating cycle, and functions as a cooling switch for setting the cooling mode. A hot gas switch 29b sets the heating mode by the hot gas heater cycle H and functions as a heating switch.

Further, the air conditioning operation panel 28 is provided with a blowing mode switching switch 29c for switching the blowing mode of the air conditioner, a temperature setting switch (temperature setting unit) 29d for setting the temperature in the passenger compartment at a desired temperature, a blower switch 29e for commanding turning on/off the blower 23 and switching the flow amount of air, and an inside air/outside air selection switch 29f for commanding switching between the outside air suction mode and the inside air suction mode.

In the first embodiment, when the blower switch 29e is turned on and operation signal (i.e., ON signal) of the blower 23 is output, an air-conditioning automatic control starts.

That is, the blower switch 29e is used as an automatic switch for commanding the air-conditioning automatic control.

Next, in the above construction, the operation of the vehicle air conditioner according to the above embodiment will now be described. First, the operation of the refrigerating cycle system will be described. When the air conditioning switch 29a is turned on to set the cooling mode, the solenoid valve 13 for cooling is opened and the solenoid valve 21 for heating is closed by the ECU 26. Thus, when the electromagnetic clutch 11 becomes in the connecting state and the compressor 10 is driven by the engine 12, the gas refrigerant discharged from the compressor 10 flows through the solenoid valve 13 for cooling, which is in the open state, into the condenser 14.

In the condenser 14, the refrigerant is cooled and condensed by the outside air that is blown by the cooling fan 14a. Then, the refrigerant having passed through the condenser 14 is separated by the liquid receiver 15 into the gas refrigerant and the liquid refrigerant. The separated liquid refrigerant is exclusively reduced in pressure by the thermal expansion valve 16 so that a gas-liquid two-phase refrigerant with low temperature and low pressure is obtained.

Next, the low-pressure refrigerant passes through the check valve 17 and flows into the evaporator 18, and evaporates in the evaporator 18 by absorbing heat from the air blown by the blower 23. The air cooled in the evaporator 18 flows into the passenger compartment to cool the passenger compartment. The gas refrigerant evaporated in the evaporator 18 is sucked into the compressor 10 through the accumulator 19 to be compressed in the compressor 10.

When the hot gas switch 29b is turned on in winter to set the heating mode by using the hot gas heater cycle H, the solenoid valve 13 for cooling is closed and the solenoid valve 21 for heating is opened by the ECU 26 so that the hot gas bypass passage 20 is opened. As a result, the high-temperature gas refrigerant (or the superheated gas refrigerant) discharged from the compressor 10 passes through the heating solenoid valve 21 in the open state and is reduced in pressure by the throttle 21a and then flows into the evaporator 18. In other words, the superheated gas refrigerant (hot gas) from the compressor 10 bypasses the condenser 14 and the like and directly flows into the evaporator 18.

At this time, the check valve 17 prevents the gas refrigerant from flowing from the hot gas bypass passage 20 to the thermal expansion valve 16. As a result, in the heating mode, the refrigerating cycle is run by the closed circuit (i.e., the hot gas heater cycle H) of the discharge side of the compressor 10, the solenoid valve 21 for heating, the throttle 21a, the evaporator 18, the accumulator 19, and the suction side of the compressor 10.

Moreover, the superheated gas refrigerant having been reduced in pressure by the throttle 21a heats the blown air by releasing its heat to the blown air in the evaporator 18. Here, the heat quantity to be released from the gas refrigerant in the evaporator 18 corresponds to the compression workload of the compressor 10. The gas refrigerant having released its heat in the evaporator 18 is sucked into the compressor 10 to be compressed after passing through the accumulator 19.

When the temperature of water (engine-cooling water) is lower than a predetermined temperature (e.g., 30° C.) as just after the start-up of the engine 12, a stop state of the air conditioning blower 23 is maintained even when the blower switch 29e is turned on. Thereafter, when the hot water temperature in the engine 12 increases to a predetermined temperature, the air conditioning blower 23 starts its operation by a low air flow amount. That is, a warm-up control of the air conditioning blower 23 is performed so that a rotation speed (corresponding to air flow amount) of the air conditioning blower 23 is increased as the hot water temperature increases.

By flowing the hot water through the hot water valve 25 into the hot water type heating heat exchanger 24, the blown air having heated by the evaporator 18 can be further heated in the heating heat exchanger 24. Therefore, even in the cold weather, the warm air, that is heated by both the evaporator 18 and the hot water type heating heat exchanger 24 to have higher temperature, can be blown into the passenger compartment.

Figure 3:
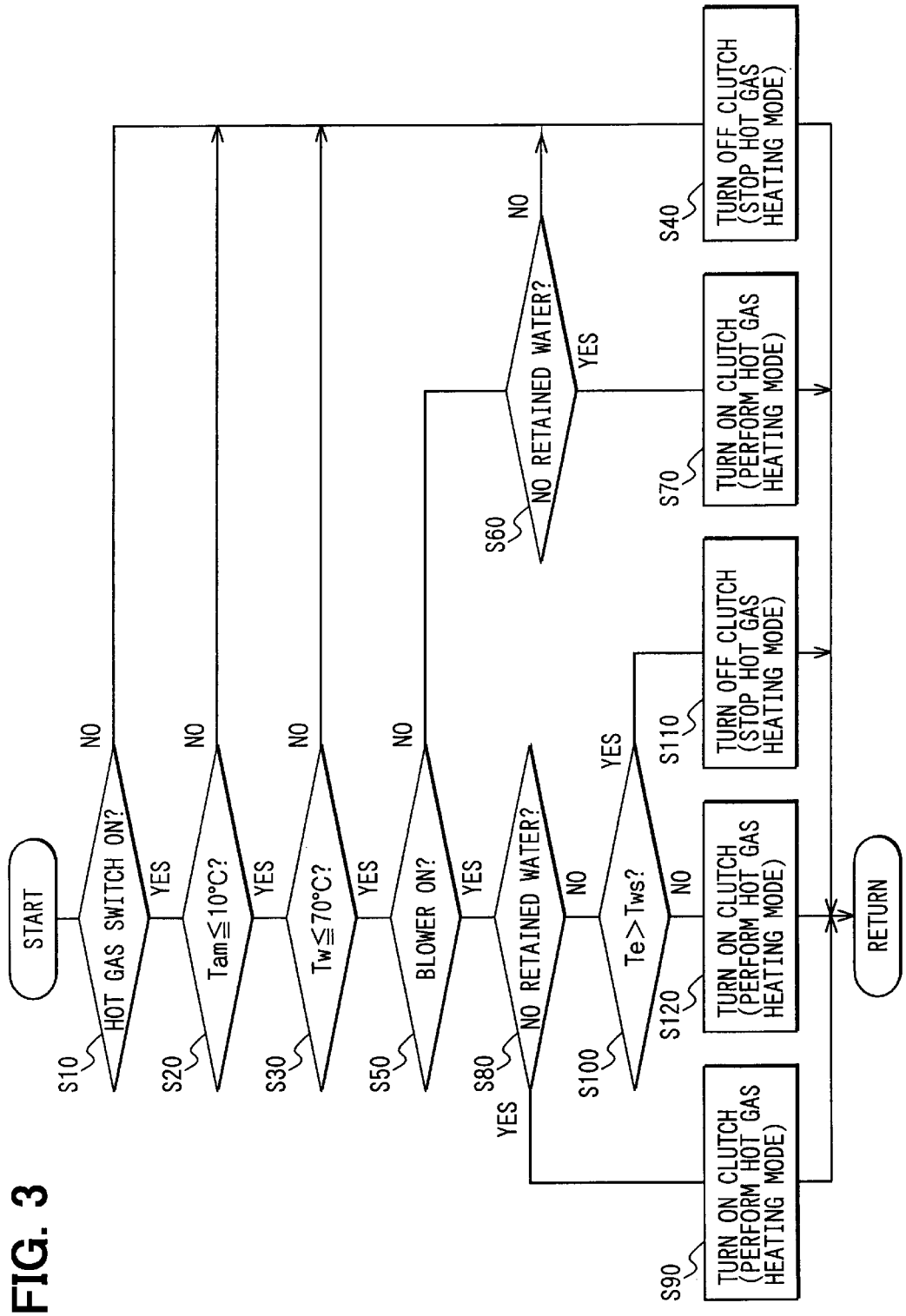
FIG. 3 is a flow diagram showing a compressor control in a hot gas heating mode in accordance with the first embodiment.

Next, the operation control of the heating mode of the hot gas heater cycle H in accordance with the first embodiment will be described specifically with reference to FIG. 3. The control routine of FIG. 3 is started by starting (by turning ON the ignition switch) of the vehicle engine 12. First, at step S10, it is determined whether or not the hot gas switch 29b of the air conditioning operation panel 28 is turned ON. When the hot gas switch 29b is turned ON, that is, when the hot gas heating mode is set, the solenoid valve 13 for cooling is closed and the solenoid valve 21 for heating is opened. When the hot gas heating mode is set at step S10, the control routine advances to step S20. At step S20, it is determined whether or not the outside air temperature Tam is equal to or lower than a predetermined outside temperature (e.g., 10° C.). When the outside air temperature Tam is equal to or lower than the predetermined outside temperature, it is determined whether or not a water temperature Tw in the engine is equal to or lower than a predetermined water temperature (e.g., 70° C.). That is, at steps S20 and S30, it is determined whether or not the present environment condition is an environment condition that needs the hot gas heating mode due to the hot gas heater cycle. When the outside air temperature Tam is higher than the predetermined outside temperature (e.g., 10° C.), the heating load of the air conditioner is small, and the hot gas heating mode is unnecessary. On the other hand, when the water temperature Tw in the engine is higher than the predetermined water temperature (e.g., 70° C.), the heating capacity due to the heating heat exchanger 24 can be improved, and it is also unnecessary to perform the hot gas heating mode. Accordingly, when the determination at step S20 or step S30 is NO, or when the hot gas switch 29b is turned off, the electromagnetic clutch 11 is turned off, and the hot gas heating mode is stopped.

On the other hand, when both the determinations of steps S20 and S30 are YES, it is determined that the present environment condition needs the hot gas heating mode. In this case, it is determined whether or not the air conditioning blower 23 is turned on at step S50. The determination at step S50 can be performed based on a control signal of the ECU 26 output to the blower motor 23a of the air conditioning blower 23. Specifically, when the air conditioning blower 23 stops due to the control signal from the ECU 26, the determination of step S50 is NO. Generally, the air conditioning blower 23 stops in both a case where the blower switch 29e is manually turned off, and a warm-up control case where a stop state of the air conditioning blower 23 is maintained by the control signal of the ECU 26 even when the blower switch 29e is turned on.

When the determination at step S50 is NO, it is determined whether or not the evaporator 18 is in a no retained water state at step S60. That is, step S60 determines whether or not there is no retained water in the evaporator 18. A method of calculating the quantity of retained water in the evaporator 18 will be described with reference to FIGS. 4A–4D. If the quantity of retained water in the evaporator 18 becomes smaller than a predetermined minimum quantity close to zero, it is determined that no quantity of water is retained in the evaporator 18 (no retained water state). When no quantity of water is retained in the evaporator 18 even if the evaporator 18 acts as the heat radiator of the hot gas, the condensed water in the evaporator 18 does not evaporate and hence does not cause the windshield to fog. Then, the control routine advances to step S70 where an electric current is passed through the electromagnetic clutch 11 to put the electromagnetic clutch 11 in the connection state (ON state). In this case, the compressor 10 is driven and put into the state of operation (ON) by the vehicle engine 12 via the electromagnetic clutch 11. The operation of the hot gas heating mode is performed at step S70, when the air conditioning blower 23 stops and when there is no retained water in the evaporator 18. Accordingly, in this case, a heating capacity control, which is performed based on the evaporator air temperature Te detected by the temperature sensor 27c, is not performed. Thus, even when the temperature Te detected by the temperature sensor 27c is greatly increased by the stop of the air blowing from the air conditioning blower 23 to the evaporator 18, the operation of the hot gas heating mode can be continued without any trouble.

Further, even when the hot gas heating mode is performed at step S70, because the evaporator 18 does not have the retained water, the windshield of the vehicle is not fogged. Simultaneously, with the operation of the hot gas heating mode, the driving load of the compressor 10 is applied to the vehicle engine 12, and heat-radiating amount to the cooling water in the vehicle engine 12 increases thereby fastening the increase of the water temperature Tw in the engine. As a result, the hot gas heating mode at step S70 can be also used for rapidly increasing the heating capacity of the heating heat exchanger 24.

On the other hand, if the quantity of retained water in the evaporator 18 becomes larger than the predetermined minimum quantity at step S60, it is determined that the quantity of water is retained in the evaporator 18, and the control routine advances to step S40. At step S40, the electromagnetic clutch 11 is turned off, the operation of the compressor 10 is stopped, and the hot gas heating mode is stopped. Accordingly, it can prevent the windshield from being fogged due to the evaporation of condensed water in the evaporator 18.

When it is determined that the air conditioning blower 23 is in the operation state (ON state) at step S50, the no retained water state of the evaporator 18 is determined at step S80, similarly to step S60. Further, at step S80, the method of calculating the quantity of retained water in the evaporator is similar to that at step S60. When it is determined that the evaporator 18 does not the retained water at step S80, the electromagnetic clutch 11 is turned on at step S90, the compressor 10 operates, and the hot gas heating mode is continuously operated at step S90. On the other hand, when it is determined that the evaporator 18 has the retained water at step S80, it is determined whether or not the evaporator air temperature Te from the evaporator 18 is higher than a windshield temperature Tws. Here, the evaporator air temperature Te is the temperature directly detected by the temperature sensor 27c, and the windshield temperature Tws is the temperature of the inside surface of the windshield in the passenger compartment. The temperature Tws of the inside surface of the windshield can be calculated (estimated) based on the outside air temperature Tam and a temperature increase caused by the air (warm air) blown into the passenger compartment. Alternatively, the temperature of the inside surface of the windshield can be directly detected by a temperature sensor. Then, if Te>Tws, the control routine advances to step S110 where the electric current passing through the electromagnetic clutch 11 is stopped (OFF) to stop the operation of the compressor 10. In this case, it can prevent the windshield from being fogged by the evaporation of condensed water on the evaporator 18. On the other hand, if Te≦Tws, the control routine advances to step S120 where the electromagnetic clutch 11 is put into the connection state (ON) so that the compressor 10 is operated (ON state). In this case, the hot gas heating mode can be performed.

As described above, while the blower 23 operates, by intermittently controlling the operation of the compressor 10, the evaporator air temperature Te can be controlled at a temperature equal to or lower than the windshield temperature Tws. Here, during the heating mode, to prevent the fogging of the windshield, the outside air suction mode for introducing the outside air of low absolute humidity may be selected as the inside air/outside air suction mode. In the cold weather which requires the heating mode of the hot gas heater cycle H, the low-temperature outside air at a temperature close to 0° C. is introduced into the evaporator 18. Even if the low-temperature outside air is low in absolute humidity, it is originally high in relative humidity. In addition to this, if the condensed water in the evaporator 18 evaporates, the relative humidity of air blown from the evaporator 18 is as high as about from 85% to 90%.

The air blown from the evaporator 18 is heated by the hot-water type heat exchanger 24 to increase its temperature and then is blown into the passenger compartment from the air conditioning case 22. When this blown air contacts the windshield at a low temperature to be cooled to a temperature lower than the evaporator air temperature Te, it reaches a dew point and causes the windshield to fog.

However, according to the first embodiment, when the evaporator 18 has the quantity of retained water while the blower 23 operates, the compressor 10 is turned on and off at the steps S90, S110, S120 described above to make the evaporator air temperature Te lower than the windshield temperature Tws. Thus, even if the air blown into the passenger compartment contacts the windshield at the lower temperature to be cooled to a temperature nearly equal to the temperature of the windshield, its relative humidity is increased only to the value (about from 85% to 90%) of the relative humidity of the air blown out of the evaporator 18.

In other words, even if the air blown into the passenger compartment is cooled by the windshield at the steps S90, S110, S120 described above, the evaporator air temperature Te can be controlled within a range not reaching a dew point. This can surely prevent the fogging of the windshield even if the condensed water evaporates in the evaporator 18 in the heating mode.

Next, the concept of calculating the quantity of retained water in the evaporator 18 will be described with reference to FIGS. 4A–4D. FIG. 4A shows the relationship between a change in the operation mode of a refrigerating cycle for the air conditioner and a change in the quantity of retained water in the evaporator 18 associated therewith. When the cooling mode is set during the operation of the vehicle engine, the condensed water is generated by the cooling and dehumidifying operation of the evaporator 18, so that the quantity of retained water in the evaporator 18 increases in proportion to the operation time of the cooling mode (operation time of the compressor).

Here, FIG. 4A shows a change in the quantity of retained water in the case where the maximum quantity (full quantity) of condensed retained water in the evaporator 18 is 250 cc. The evaporator 18 is a laminated evaporator that is generally used in the vehicle air conditioner and is constructed of a heat-exchanging structure with flat tubes and corrugated fins. The condensed water is attached to and held on the surface of the fins and the like in the evaporator 18.

Since the full quantity of retained water is 250 cc in the example shown in FIGS. 4A–4D, when the quantity of retained water calculated by the ECU 26 reaches the full quantity of retained water (250 cc), the ECU 26 does not further increase the quantity of retained water but keep the quantity of retained water at a constant value (e.g., full quantity).

The example (1) in FIG. 4A shows the quantity of condensed water generated in the cooling mode shown in FIG. 4B. This quantity of condensed water shown in FIG. 4B is a quantity per unit time (cc/min) and means a value obtained by substituting the quantity of condensed water discharged from the discharge port 22a of the air conditioning case 22 from the quantity of condensed water generated from the evaporator 18. In the example shown in FIG. 4B, the temperature of the horizontal axis designates the temperature T(SUCK) of evaporator suction air and the percentage (%) designates the relative humidity H(R) of the evaporator suction air. Further, Me2 shows the blower level. As the temperature T(SUCK) of the evaporator suction air becomes higher, the absolute humidity of the evaporator suction air increases and the quantity of condensed water increases.

In FIG. 4B, the Me2 of the horizontal axis shows that the quantity of air of the air conditioning blower 23 is the second middle quantity of air (in this example, about 280 m$^3$/h). In this respect, the quantity of air of the air conditioning blower 23 can be manually switched between four steps of a low quantity of air (Lo), a first middle quantity of air (Me1), a second middle quantity of air (Me2), and a large quantity of air (Hi). The second middle quantity of air (Me2) is the second largest quantity of air next to the large quantity of air (Hi).

An uncontrolled mode shown in FIG. 4A includes both of a case where the compressor 10 is stopped during the operation of the vehicle engine 12 and where neither the cooling mode nor the hot gas heating mode is set, and a case where the compressor 10 is stopped in accordance with the stop of the vehicle engine 12, as shown by the example (2). Therefore, the uncontrolled mode in the present invention means the state where the compressor 10 is in the stop state.

Here, the uncontrolled mode includes both of a case where the air conditioning blower 23 is operated and a case where the air conditioning blower 23 is stopped. When the vehicle engine 12 is operated, the air conditioning blower 23 is generally in the state of operation. Therefore, in the uncontrolled mode in FIG. 4A, when the air conditioning blower 23 is stopped, the vehicle engine 12 is in the state of stop.

In the uncontrolled mode, because the condensed water is discharged from the discharge port 22a of the air conditioning case 22, the quantity of retained water in the evaporator 18 is decreased by the quantity of water discharged from the discharge port 22a. FIG. 4C shows the example (2) in FIG. 4A. As shown in FIG. 4C, when the air conditioning blower 23 is stopped in the uncontrolled mode, the quantity of retained water in the evaporator 18 is decreased with a pass of time in the uncontrolled mode due to the quantity of water discharged from the discharge port 22a.

According to the inventor's experiment and study, in the uncontrolled mode, when the air conditioning blower 23 is stopped, a state where the quantity of water discharged from the discharge port 22a is large is kept for a predetermined time (specifically, one hour) after the stop of the compressor 10, and therefore the quantity of retained water in the evaporator 18 rapidly decreases for the predetermined time. Thereafter, the quantity of discharged water is decreased to a minimum quantity so that the quantity of retained water is decreased by a small quantity. Moreover, if the air blowing mode for operating the air conditioning blower 23 is set in the uncontrolled mode, the condensed water is pushed out from the evaporator 18 by the air flowing pressure to increase the quantity of discharged water again. Thus, as can be seen from the latter half portion in the uncontrolled mode in FIG. 4A, the quantity of retained water in the evaporator 18 decreases again by the operation of the blower 23.

Next, when the hot gas heating mode is set as shown by the example (3) in FIG. 4A, the condensed water is evaporated in the evaporator 18 by the radiation of the evaporator 18, so that the quantity of retained water in the evaporator 18 is decreased by the quantity of evaporated water. Here, even in the hot gas heating mode, since the condensed water is discharged from the discharge port 22a of the air conditioning case 22, the quantity of evaporated water shown in FIG. 4D (example (3) in FIG. 4A) includes the quantity of water discharged from the discharge port 22a. As shown in FIG. 4D, the quantity of water evaporated in the hot gas heating mode increases as the evaporator air temperature Te becomes higher.

From the study using FIGS. 4A–4D, the quantity of retained water in the evaporator 18 can be fundamentally expressed by the following mathematical equation 1.

Quantity of retained water in the evaporator [W(R)]=quantity of condensed water [W(C)]–quantity of evaporated water [W(E)]–quantity of discharged water in the uncontrolled mode [W(D)]  [Mathematical Equation 1]

That is, [W(R)]=[W(C)]–[W(E)]–[W(D)] where the quantity of water discharged in the uncontrolled mode includes both of the quantity of water discharged when the air conditioning blower 23 is operated and the quantity of water discharged when the air conditioning blower 23 is stopped, as described above.

Next, a method for specifically calculating the quantity of retained water in the evaporator 18 will be described with reference to FIG. 5. The control routine in FIG. 5 starts with the start-up of the vehicle engine 12 (turning on an ignition switch). The control unit always calculates the quantity of retained water in the evaporator 18 during the operation of the vehicle engine 12 and for a predetermined time (for example, one hour) after the stop of the vehicle engine 12, and updates the calculated value of the quantity of retained water in the evaporator 18 at predetermined time intervals (for example, every one minute).

Figure 5:
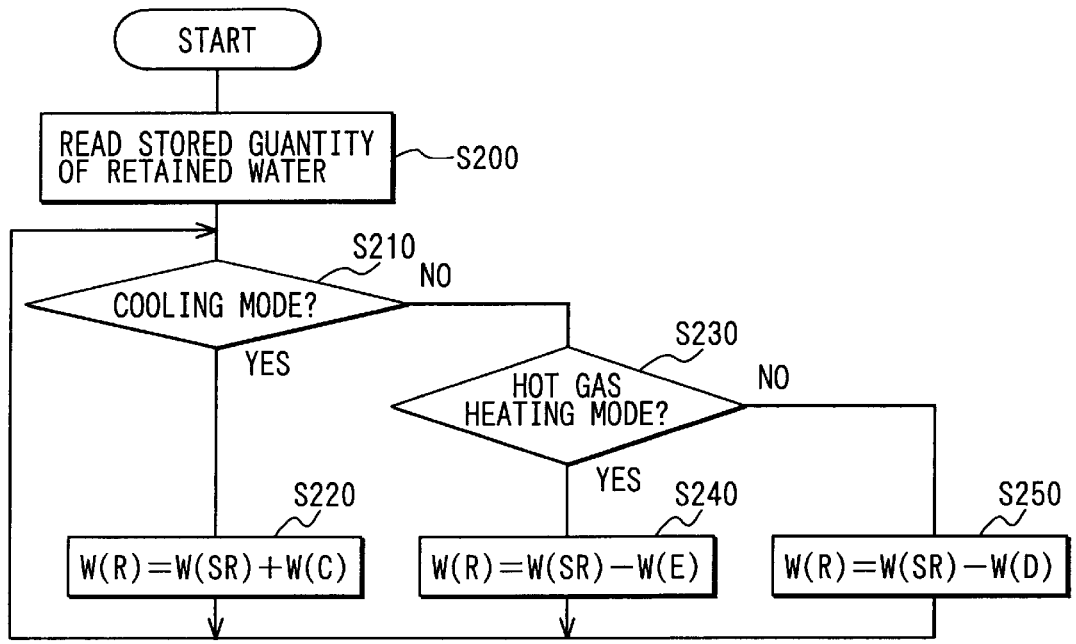
FIG. 5 is a flow diagram showing a method for calculating the quantity of retained water in the evaporator in accordance with the first embodiment.

In FIG. 5, first, the stored quantity of retained water is read at step S200. This stored quantity of retained water is the quantity of retained water in the evaporator 18 that is calculated at a point where a predetermined time (e.g., 1 hour) elapses after the previous stop of engine 12 and is stored by the storage means of the ECU 26. This storage means can store and hold the information of the quantity of retained water even after electric power supply to the ECU 26 is stopped.

At the next step S210, it is determined whether or not the cooling mode is set. Specifically, whether or not the cooling mode is set can be determined from whether or not the air conditioning switch 29a is turned on. When the cooling mode is set, the control routine advances to step S220 where the quantity of retained water in the cooling mode is calculated by the following equation:

$$W(R)=W(SR)+W(C)$$

wherein W(R) is the quantity of retained water, W(SR) is the stored quantity of retained water, and W(C) is the quantity of condensed water in the cooling mode.

Specifically, the quantity of condensed water in the cooling mode increases, as the absolute humidity of the evaporator suction air becomes higher and the ON time of the compressor (electromagnetic clutch) in the cooling mode becomes longer. Thus, the quantity of condensed water is calculated based on information relating to the absolute humidity of the evaporator suction air and the ON time of the compressor.

At step S220, the quantity of condensed water in the cooling mode is calculated, and is added to the stored quantity of retained water, so that the quantity of retained water in the cooling mode is calculated.

Here, the quantity of condensed water in the cooling mode is also related to the quantity of evaporator suction air and increases as the quantity of evaporator suction air increases. Thus, to increase the accuracy of the calculation of the quantity of condensed water, the calculated quantity of condensed water can be corrected to be increased as the quantity of evaporator suction air increases.

On the other hand, if the determination result at step S210 is NO, the control routine advances to step S230 where it is determined whether or not the hot gas heating mode is set. Specifically, it is possible to determine whether or not the hot gas heating mode is set by whether or the hot gas switch 29b is turned on. When the hot gas heating mode is set, the control routine advances to step S240 where the quantity of retained water in the hot gas heating mode is calculated by the equation:

$$W(R)=W(SR)-W(E)$$

Here, W(R) is the quantity of retained water, W(SR) is the store quantity of retained water, and W(E) is the quantity of water evaporation.

Here, the quantity of water evaporation W(E) in the hot gas heating mode is specifically calculated based on the map in FIG. 4D. As the evaporator air temperature Te becomes higher, the relative humidity in the vicinity of the evaporator tends to decrease and thus the quantity of evaporation of the condensed water increases. For this reason, the quantity of water evaporation per unit time (cc/min) increases in response to an increase in the evaporator air temperature Te.

On the other hand, when the determination result at step S230 is NO, the mode is neither the cooling mode nor the hot gas heating mode, but is the uncontrolled mode where the compressor 10 is stopped. At this time, the control routine advances to step S250 where the quantity of retained water in the uncontrolled mode is calculated by the equation.

$$W(R)=W(SR)-W(D)$$

wherein, W(R) is the quantity of retained water in the evaporator, W(SR) is the stored quantity of retained water in the evaporator, and W(D) is quantity of discharged water.

Here, the quantity of discharged water in the uncontrolled mode is the quantity of condensed water to be discharged to the outside of the air conditioning case 22 from the discharge port 22a.

Here, the case where the air conditioning blower 23 is stopped in the uncontrolled mode includes both of the case where the vehicle engine 12 is operated and the case where the vehicle engine 12 is stopped. When the vehicle engine 12 is stopped, to prevent a decrease in the charged capacity of a vehicle-mounted battery as much as possible, the operation of the ECU 26 after the stop of the vehicle engine 12 should be limited to as short as possible.

According to the above-mentioned characteristics in FIG. 4A, the quantity of discharged water decreases to a small quantity in a predetermined period of time (for example, one hour) after the start of the uncontrolled mode (after the stop of the blower). Thus, in the uncontrolled mode after the stop of the vehicle engine 12, the ECU 26 calculates the quantity of discharged water for the predetermined period of time (for example, one hour) after the stop of the engine, and the storage unit of the ECU 26 stores the quantity of retained water in the evaporator after the predetermined period of time after the stop of the engine. Counting time for the predetermined period after the stop of the engine 12 can be performed by the timer function of the ECU 26.

By the way, the windshield temperature Tws used for the determination at step S100 in FIG. 3 can be directly detected by a dedicated temperature sensor mounted on the inside surface of the windshield, but this method increases cost because of the additional temperature sensor. Thus, in the first embodiment, the windshield temperature Tws is calculated (estimated) by the use of the existing sensor signals of the air conditioner.

That is, the windshield temperature Tws is equal to the outside air temperature Tam in the initial state before the start-up of the air conditioner. Thereafter, when the warm air is blown into the passenger compartment by the operation of the heating mode, the windshield temperature Tws is increased by the warm air blown toward the windshield. As a result, assuming that an increase in the windshield temperature by the warm air is as ΔTws, the windshield temperature Tws can be calculated by the equation:

$$Tws=Tam+\Delta Tws$$

Here, since the warm air blown into the passenger compartment in the hot gas heating mode is heated by the hot water type heating heat exchanger 24 after it passes through the evaporator 18, the warm air temperature substantially depends on the hot water temperature. For this reason, the increase ΔTws in the windshield temperature by the warm air blow increases in proportion to an increase in engine cooling water temperature (hot water temperature circulating through the hot water type heating heat exchanger 24). As a result, the increase ΔTWS in the windshield temperature by the warm air can be calculated based on the engine cooling water temperature Tw (hot water temperature).

Since the increase ΔTws in the windshield temperature by the blown warm air is affected also by the quantity of warm air blown to the inner surface of the windshield in addition to the warm air temperature, in order to increase the accuracy of calculating the increase ΔTws in the windshield temperature, the effect of flow amount of the warm air is also considered. Here, the degree of effect of the quantity (flow amount) of warm air is determined by the air blowing level and the blowing mode of the air conditioning blower 23.

Further, the windshield is cooled by the high-speed air due to a vehicle running. Therefore, the windshield temperature Tws can be calculated in consideration of a temperature decrease due to the cooling effect of the high-speed air toward the windshield. In this case, the windshield temperature Tws can be more accurately calculated.

According to the first embodiment of the present invention, when the evaporator 18 is in the no retained water state while the blower 23 stops, the operation of the hot gas heating mode is continued while being not controlled based on the evaporator air temperature (Te) from the evaporator 18. Therefore, the hot gas heater cycle can be normally operated in the hot gas heating mode, and the water temperature in the engine can be effectively increased by the increase of the compressor driving load. Accordingly, the water temperature in the heating heat exchanger 24 is rapidly increased, and the heating capacity in the hot gas heating mode can be further improved. On the other hand, when the evaporator 18 has the retained water while the blower stops, the operation of the hot gas heater cycle in the hot gas heating mode is stopped. Therefore, the windshield is not fogged.

(Second Embodiment)

In the above-described first embodiment, the quantity of retained water in the evaporator is calculated based on the quantity of condensed water in the cooling mode, the quantity of water evaporation in the hot gas heating mode, and the quantity of discharged water in the uncontrolled mode, and it is determined whether the evaporator 18 is in the retained water state by using the calculated quantity of retained water in the evaporator 18. However, in the second embodiment, the determination of the retained water state in the evaporator 18 is simply performed based on the operation history of the cooling mode.

Figure 6:
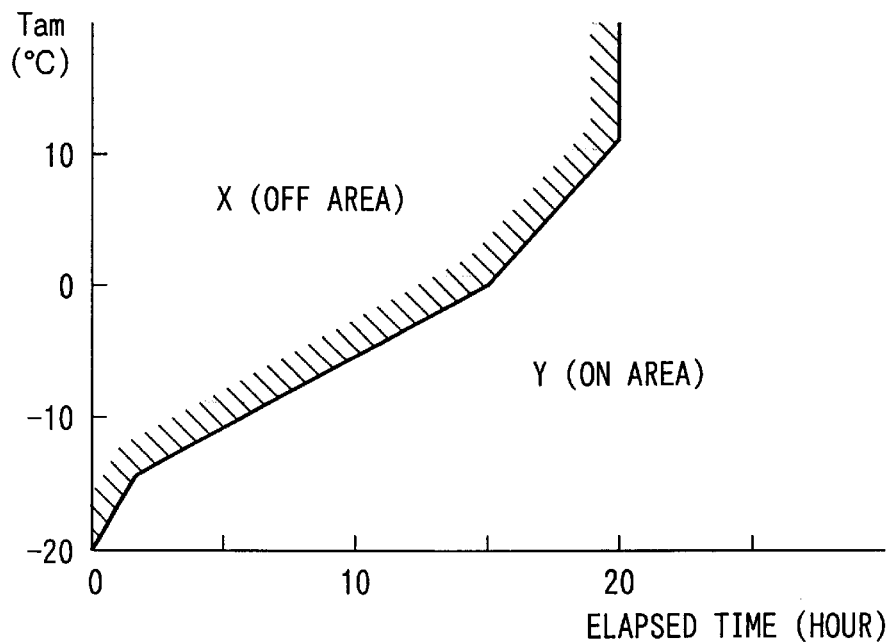
FIG. 6 is a characteristic diagram for determining whether the evaporator has the retained water, according to a second embodiment of the present invention.

FIG. 6 is a characteristic view for the determination of the retained water of the evaporator 18 according to the second embodiment. The horizontal axis of FIG. 6 shows an elapsed time t after a stop of the operation of the cooling mode. Because the total discharge quantity of the condensed water from the discharge port 22a of the air conditioning case 22 increases as the elapsed time becomes longer, the quantity of the retained water of the evaporator 18 decreases as shown in FIG. 4A. Further, as shown in FIG. 4B, as the temperature of air introduced into the evaporator 18 becomes higher, the absolute humidity of air sucked into the evaporator becomes higher, and the quantity of the condensed water in the cooling mode increases. Further, because the air temperature sucked into the evaporator 18 has a relation with the outside air temperature, the generation amount of the condensed water in the cooling mode increases as the outside air temperature becomes higher. Accordingly, in the second embodiment, as shown in FIG. 6, an area X (i.e., OFF area of the hot gas heating mode) and an area Y (i.e., ON area of the hot gas heating mode) are partitioned by a partition line Z. In the area X of FIG. 6, it is determined that the evaporator 18 has the retained water. On the other hand, in the area Y of FIG. 6, it is determined that the evaporator 18 does not have the retained water. The area X extends to the wider range where the elapsed time t after the stop of the cooling mode becomes longer, as the outside temperature Tam becomes higher. Conversely, the area Y is early set relative to the elapsed time t, as the outside air temperature Tam becomes lower.

According to the second embodiment, the area X and the area Y are determined based on the outside air temperature Tam and the elapsed time t after the stop of the cooling mode, and the retained water state of the evaporator 18 is determined. Accordingly, the determination of the retained water state of the evaporator 18 can be readily performed.

Accordingly, in the second embodiment, when the area X is determined while the blower 23 stops, the operation of the hot gas heater cycle in the hot gas heating mode is stopped. On the other hand, when the area Y is determined while the blower 23 stops, the operation of the hot gas heater cycle in the hot gas heating mode is performed. That is, those control corresponds to the control of steps S60, S40 and S70 in FIG. 3 of the above-described first embodiment. Further, the determination of the retained water state in the evaporator 18 can be used while the blower 23 is operated.

In the second embodiment, the other parts are similar to those of the above-described first embodiment, and detail description thereof is omitted.

Although the present invention has been fully described in connection with the preferred embodiments thereof with reference to the accompanying drawings, it is to be noted that various changes and modifications will become apparent to those skilled in the art.

For example, in the above embodiments, the air conditioning operation panel 28 is provided with the dedicated hot gas switch 29b manually operated by the occupant and the hot gas heating mode is set by turning on the hot gas switch 29b. However, when the ECU 26 determines the maximum heating state and the like, the hot gas heating mode can be automatically started without providing the dedicated manually operated switch.

Moreover, in the manually operated air conditioner, the air conditioning operation panel 28 is provided with a dial-shaped or lever-shaped temperature adjusting operation member for manually operating temperature adjusting units such as an air mix door for adjusting the ratio of the quantity of warm air to the quantity of cool air, and a hot water valve for adjusting a hot water flow rate in the heating heat exchanger 24. Therefore, when this temperature adjusting operation member is operated to the maximum heating position, the hot gas switch 29b can be turned on in operative cooperation with the operation of the temperature adjusting operation member. This can eliminate the operation member dedicated for the hot gas switch 29b.

Such changes and modifications are to be understood as being within the scope of the present invention as defined by the appended claims.

What is claimed is:

1. An air conditioner for a vehicle, comprising:

an air conditioning case for defining an air passage through which air flows into a passenger compartment of the vehicle;

a blower disposed in the air conditioning case for blowing air;

a refrigerant cycle system including a compressor for compressing refrigerant, an exterior heat exchanger disposed outside the air conditioning case, a pressure reducing device for decompressing refrigerant, an interior heat exchanger disposed inside the air conditioning case and a hot gas bypass passage through which refrigerant discharged from the compressor is directly introduced into the interior heat exchanger while bypassing the exterior heat exchanger, the refrigerant cycle system being constructed to switch a cooling refrigerant cycle where refrigerant discharged from the compressor is returned to the compressor through the exterior heat exchanger, the pressure reducing device and the interior heat exchanger, and a hot gas heater cycle where the refrigerant discharged from the compressor is directly introduced to the interior heat exchanger through the hot gas bypass passage; and a control unit for controlling operation of the refrigerant cycle system to set a cooling mode for cooling air in the interior heat exchanger by using the cooling refrigerant cycle, and a heating mode for heating air in the interior heat exchanger by using the hot gas heater cycle, wherein:

the control unit includes determining means for determining whether the interior heat exchanger has a quantity of retained water, and control means that performs operation of the heating mode when the determining means determines that the interior heat exchanger does not have the quantity of retained water when the heating mode is set while operation of the blower stops, and stops the operation of the heating mode when the determining means determines that the interior heat exchanger has the quantity of retained water when the heating mode is set while operation of the blower stops.

2. The air conditioner according to claim 1, wherein:

when the determining means determines that the interior heat exchanger does not have the quantity of retained water when the heating mode is set while the blower operates, the control means performs operation of the heating mode; and when the determining means determines that the interior heat exchanger has the quantity of retained water when the heating mode is set while the blower operates, the control means controls temperature of air blown out of the interior heat exchanger to a range lower than a dew point even when air blown out of the air conditioning case is cooled by a vehicle windshield.

3. The air conditioner according to claim 2, wherein the control means controls the temperature of air blown out of the interior heat exchanger by controlling a discharge capacity of the compressor.

4. The air conditioner according to claim 1, wherein the control unit further has calculation means for calculating the quantity of retained water based on at least a quantity of condensed water in the interior heat exchanger in the cooling mode, a quantity of evaporation of condensed water in the interior heat exchanger in the heating mode, and a quantity of condensed water discharged from a discharge port of the air conditioning case in an uncontrolled mode where the compressor is in a stop state.

5. The air conditioner according to claim 1, wherein the quantity of condensed water is calculated at least based on an elapsed time after a stop of operation of the cooling mode.

6. The air conditioner according to claim 5, wherein the quantity of condensed water is calculated based on the elapsed time and an outside air temperature.

7. The air conditioner according to claim 1, wherein the compressor is driven by an engine for running the vehicle.

* * * * *